US012582038B2

(12) United States Patent
Fredricks et al.

(10) Patent No.: US 12,582,038 B2
(45) Date of Patent: Mar. 24, 2026

(54) SYSTEM AND METHOD FOR CONTROLLING THE OPERATION OF AN AGRICULTURAL HARVESTER

(71) Applicant: CNH Industrial America LLC, New Holland, PA (US)

(72) Inventors: Eric R. Fredricks, Lancaster, PA (US); James M. Gessel, Geneseo, IL (US)

(73) Assignee: CNH Industrial America LLC, New Holland, PA (US)

( * ) Notice: Subject to any disclaimer, the term of this patent is extended or adjusted under 35 U.S.C. 154(b) by 86 days.

(21) Appl. No.: 18/588,761

(22) Filed: Feb. 27, 2024

(65) Prior Publication Data

US 2025/0268138 A1      Aug. 28, 2025

(51) Int. Cl.
A01D 41/127        (2006.01)
A01B 63/12         (2006.01)

(52) U.S. Cl.
CPC .......... A01D 41/1274 (2013.01); A01B 63/12 (2013.01)

(58) Field of Classification Search
CPC ............................ A01D 41/1274; A01B 63/12
See application file for complete search history.

(56) References Cited

U.S. PATENT DOCUMENTS

| | | | |
|---|---|---|---|
| 2,177,803 A | 10/1939 | Ferte et al. | |
| 6,289,659 B1 * | 9/2001 | Fox ........................ | A01D 46/08 56/DIG. 3 |
| 7,310,931 B2 * | 12/2007 | Gramm .................. | A01D 41/14 56/208 |
| 9,615,513 B2 * | 4/2017 | Ubaldi ................... | A01D 78/14 |
| 11,696,530 B2 * | 7/2023 | Schlipf ................. | A01B 63/111 56/10.2 E |
| 2005/0028504 A1 * | 2/2005 | Gramm .................. | A01D 41/06 56/208 |
| 2022/0338416 A1 * | 10/2022 | Racchella ............ | A01D 41/127 |

FOREIGN PATENT DOCUMENTS

| | | |
|---|---|---|
| CN | 109548472 A | 4/2019 |
| CN | 115633575 A | 1/2023 |

* cited by examiner

*Primary Examiner* — Ramsey Refai
(74) *Attorney, Agent, or Firm* — Dority & Manning, P.A.

(57)                ABSTRACT

A harvesting implement of an agricultural harvester includes a frame configured to be coupled to a harvester base vehicle. Additionally, the implement includes a cutter bar configured to sever crop material from the field and a reel rotatably coupled to the frame and configured to direct the crop material toward the cutter bar. Furthermore, the implement includes a sensor assembly including an arm coupled to the frame. The arm is configured to rotate relative to the frame between a stored position and an open position in which the arm is configured to contact the surface of the field. Additionally, the implement includes a biasing element for biasing the arm toward the field. Moreover, the implement includes an electrically activatable actuator coupled to the arm and configured to rotate the arm between the stored and open positions and apply a load to prevent the arm from rotating.

18 Claims, 5 Drawing Sheets

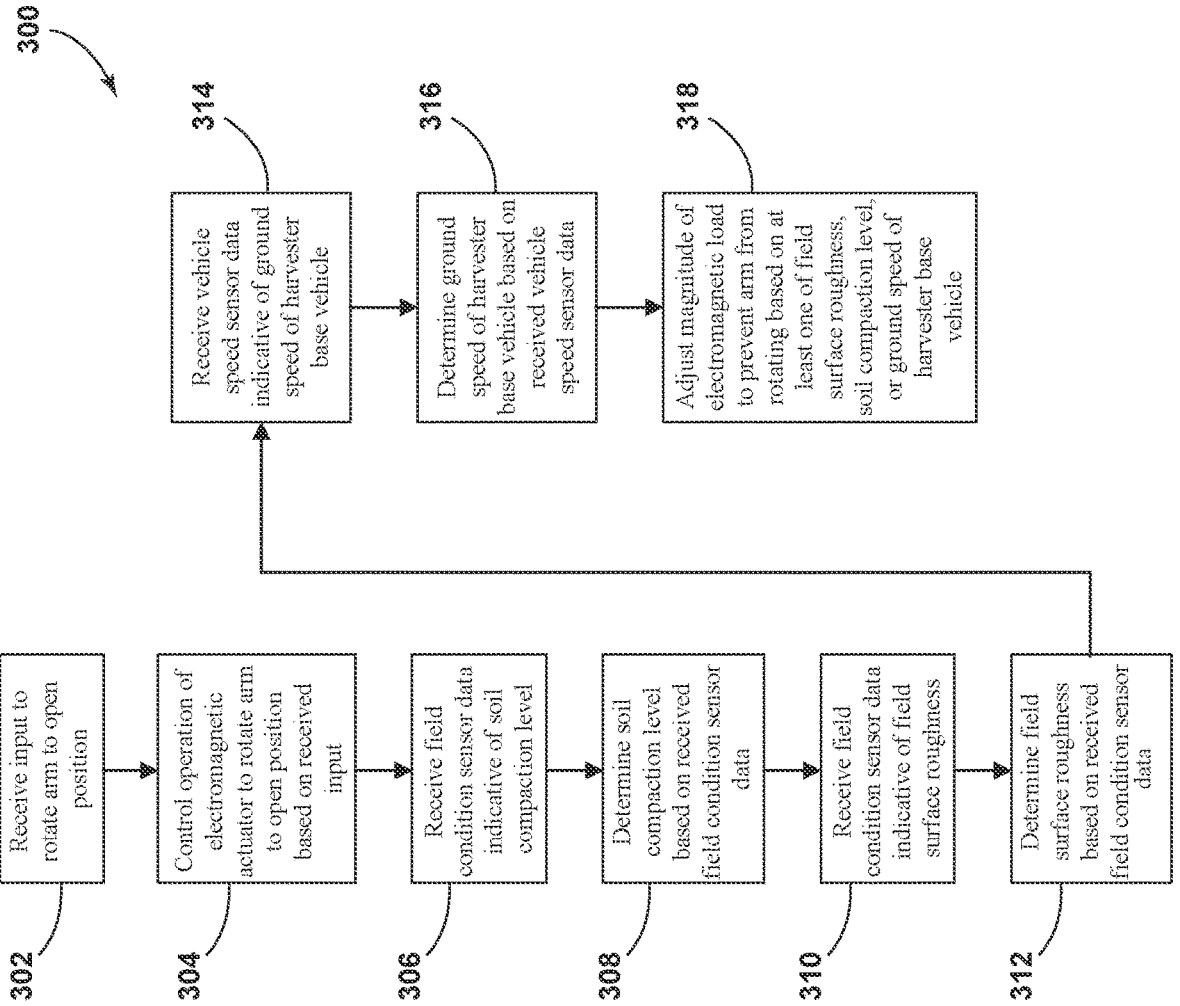

300

302 Receive input to rotate arm to open position

304 Control operation of electromagnetic actuator to rotate arm to open position based on received input 306 Receive field condition sensor data indicative of soil compaction level 308 Determine soil compaction level based on received field condition sensor data 310 Receive field condition sensor data indicative of field surface roughness 312 Determine field surface roughness based on received field condition sensor data 314 Receive vehicle speed sensor data indicative of ground speed of harvester base vehicle 316 Determine ground speed of harvester base vehicle based on received vehicle speed sensor data 318 Adjust magnitude of electromagnetic load to prevent arm from rotating based on at least one of field surface roughness, soil compaction level, or ground speed of harvester base vehicle

FIG. 4

SYSTEM AND METHOD FOR CONTROLLING THE OPERATION OF AN AGRICULTURAL HARVESTER

FIELD OF THE INVENTION

The present disclosure generally relates to agricultural harvesters and, more particularly, to systems and methods for controlling the operation of an agricultural harvester.

BACKGROUND OF THE INVENTION

A harvester is an agricultural machine used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the harvester base vehicle for further processing.

The operator of the harvester typically adjusts the height of the header during harvesting operations. As such, the header includes one or more height sensor assemblies often in the form of contact sensors with rotatable sensor arms configured to engage the surface of the field and, thus, indicate the height of the header to the operator. However, the sensor arms often require manual adjustments by the operator, which may interrupt harvesting operations.

Accordingly, an improved system and method for controlling the operation of an agricultural harvester would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a harvesting implement. The harvesting implement includes a frame configured to be coupled to a harvester base vehicle. Additionally, the harvesting implement includes a cutter bar configured to sever crop material from a field. Furthermore, the harvesting implement includes a reel rotatable coupled to the frame and configured to direct crop material toward the cutter bar. Moreover, the harvesting implement includes an implement height sensor assembly including an arm coupled to the frame. The arm is configured to rotate relative to the frame between a stored position and an open position in which the arm is configured to contact a surface of the field as the harvesting implement is moved through the field. Furthermore, the harvesting implement includes a biasing element configured to bias the arm of the implement height sensor toward the surface of the field when the arm is in the open position. Additionally, the harvesting implement includes an electrically activatable actuator coupled to the arm of the implement height sensor assembly and configured to rotate the arm between the stored position and the open position and apply a load to prevent the arm from rotating from the stored position or the open position.

In another aspect, the present subject matter is directed to a system for controlling the operation of an agricultural harvester. The system includes a harvesting implement pivotably coupled to a harvester base vehicle. The harvesting implement is configured to be pivoted such that a height of the harvesting implement above a surface of a field is adjusted. Additionally, the harvesting implement includes an implement height sensor assembly including an arm coupled to the harvesting implement. The arm is configured to rotate relative to the harvesting implement between a stored position and an open position in which the arm is configured to contact a surface of the field as the harvesting implement is moved through the field. Furthermore, the system includes an electrically activatable actuator coupled to the arm of the implement height sensor assembly and configured to rotate the arm between the stored position and the open position and apply a load to prevent the arm from rotating from the stored position or the open position. Moreover, the harvesting implement includes a computing system. The computing system is configured to receive an input to rotate the arm between the stored position and the open position. Additionally, the computing system is configured to control the operation of the electrically activatable actuator to rotate the arm between the stored position and the open position based on the received input and, once the arm is in position, prevent the arm from rotating.

In another aspect, the present subject matter is directed to a method for controlling the operation of an agricultural harvester. The agricultural harvester includes a harvesting implement coupled to a harvester base vehicle. The method includes receiving, with a computing system, an input to rotate an arm of an implement height sensor assembly relative to the harvesting implement between a stored position and an open position in which the arm is configured to contact a surface of the field as the harvesting implement is moved through the field. Additionally, the method includes controlling, with the computing system, an operation of an electrically activatable actuator coupled to the arm of the implement height sensor assembly to rotate the arm between the stored position and the open position based on the received input and, once the arm is in position, prevent the arm from rotating.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 4 illustrates a flow diagram of one embodiment of control logic for controlling the operation of an agricultural harvester in accordance with aspects of the present subject matter.

Figure 1:
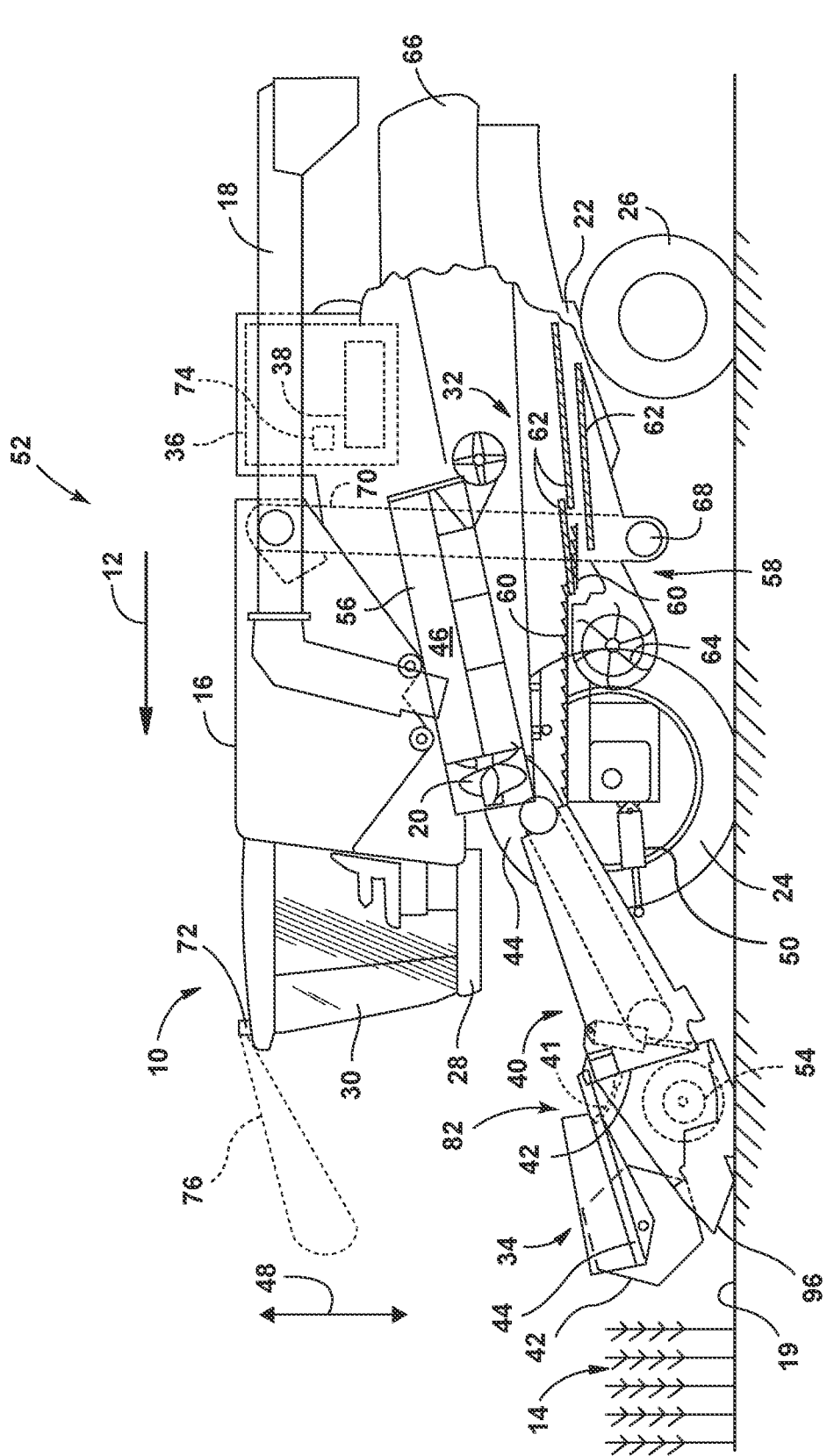
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of an agricultural harvester. Specifically, in several embodiments, the agricultural harvester includes a harvesting implement that includes a frame configured to be coupled to the harvester base vehicle of the agricultural harvester. The harvesting implement also includes a cutter bar configured to sever the crop material from the field, and a reel rotatably coupled to the frame of the harvesting implement configured to direct the crop material toward the cutter bar to be severed. Additionally, the harvesting implement includes one or more implement height sensor assemblies, each of which includes a sensor arm. The sensor arm(s) is coupled to the frame of the harvesting implement and configured to rotate relative to the frame between a stored position and an open position. When the sensor arm(s) is in the open position, the sensor arm(s) is configured to contact the surface of the field as the harvesting implement is moved through the field.

Additionally, an electrically activatable actuator, such as an electromagnetic actuator, is coupled to the sensor arm(s) and configured to rotate the sensor arm(s) between the stored position and the open position. Furthermore, once the sensor arm(s) is in position, the electrically activatable actuator is configured to apply a load (e.g., electromagnetic load) to prevent the sensor arm(s) from rotating from the stored position or the open position. Furthermore, in several embodiments, a computing system of the disclosed system is configured to control the operation of the electrically activatable actuator to rotate the arm between the stored position and the open position based on a received input, such as an operator input, to rotate the arm between the stored position and the open position.

Dynamically adjusting the load applied to the sensor arm(s) as the agricultural harvester traverses the field improves the operation of the agricultural harvester. In particular, the sensor arm(s) is oftentimes easily pivoted or rotated when the sensor arm(s) engages the field surface and, thus, a pressure or load must be applied to the sensor arm(s), which is typically accomplished with a spring that must be manually adjusted and/or using heavy materials for the sensor arm(s). However, these practices of applying loads to the sensor arm(s) does not allow for dynamic adjustment of the amount of the load that is being applied to the sensor arm(s) to ensure that the sensor arm(s) maintains contact with the field surface during harvesting operations. Dynamic adjustment of the amount of load being applied to the sensor arm(s) is useful when conditions of the field vary, such as soil compaction levels and/or the roughness of the field surface, and/or the ground speed of the harvester base vehicle, since such conditions of the field may affect the rotation of the sensor arm(s) when the sensor arm(s) engages the field surface. Such dynamic adjustment prevents the operator from having to manually adjust the pressure or load being applied to the sensor arm(s) as the field conditions change.

Referring now to the drawings, FIG. 1 illustrates a partial sectional side view of the agricultural harvester 10. In general, the harvester 10 may be configured to travel across a field in a forward direction of travel (e.g., as indicated by arrow 12) to harvest a crop 14. While traversing the field, the harvester 10 may be configured to process and store the harvested crop within a crop tank 16 of the harvester 10. Furthermore, the harvested crop may be unloaded from the crop tank 16 for receipt by the crop receiving vehicle (not shown) via a crop discharge tube 18 of the harvester 10.

As shown, in one embodiment, the harvester 10 may be configured as an axial-flow type combine in which the harvested crop is threshed and separated while being advanced by and along a longitudinally arranged rotor 20. However, it should be appreciated that, in alternative embodiments, the harvester 10 may have any other suitable harvester configuration, such as a traverse-flow type configuration.

The harvester 10 may include a harvester base vehicle 52 and a harvesting implement, such as a header 34, coupled to the harvester base vehicle 52. The harvester base vehicle 52 may include chassis or main frame 22 configured to support and/or couple to various components of the harvester 10. For example, in several embodiments, the harvester base vehicle 52 may include a pair of driven, ground-engaging front wheels 24 and a pair of steerable rear wheels 26 that are coupled to the frame 22. As such, the wheels 24, 26 may be configured to support the harvester 10 relative to the ground and move the harvester 10 in the forward direction of travel 12.

Furthermore, the harvester base vehicle 52 may include an operator's platform 28 having an operator's cab 30, a crop processing system 32, the crop tank 16, and the crop discharge tube 18 that are supported by the frame 22. As will be described below, the crop processing system 32 may be configured to perform various processing operations on the harvested crop as the crop processing system 32 operates to transfer the harvested crop between the header 34 and the crop tank 16. Furthermore, the harvester base vehicle 52 may include an engine 36 and a transmission 38 mounted on the frame 22. The transmission 38 may be operably coupled to the engine 36 and may provide variably adjusted gear ratios for transferring engine power to the wheels 24 via a drive axle assembly (or via axles if multiple drive axles are employed).

Moreover, as shown in FIG. 1, the header 34 and an associated feeder 40 of the crop processing system 32 may extend forward of the frame 22 and may be pivotally secured thereto for generally vertical movement. In general, the feeder 40 may be configured to serve as a support structure for the header 34. As shown in FIG. 1, the feeder 40 may extend between a front end 42 coupled to the header 34 and a rear end 44 positioned adjacent to a threshing and separating assembly 46 of the crop processing system 32. As is generally understood, the rear end 44 of the feeder 40 may be pivotally coupled to a portion of the harvester 10 to allow the front end 42 of the feeder 40 and, thus, the header 34 to be moved upward and downward along a vertical direction (e.g., as indicated by arrow 48) relative to a field surface 19 to set the desired harvesting or cutting height for the header 34. For example, as shown, in one embodiment, the harvester 10 may include a height actuator 50 configured to adjust the height of the header 34 relative to the ground. As such, the height actuator 50 may correspond to a fluid-driven actuator, such as a hydraulic or pneumatic cylinder, an electric linear actuator, or any other type of suitable actuator.

In some embodiments, the header 34 includes a reel 92 rotatably coupled to a reel frame 94 which is, in turn, coupled to a frame 82 of the header 34. The reel 92 is generally configured to contact crop material before a cutter bar 96 of the header 34. For instance, the reel 92 may include tines and/or the like such that, when crop materials contact the reel 92, the crop materials may be oriented into a substantially uniform direction and guided toward the cutter bar 96. The vertical positioning of the reel 92 (e.g., relative to the ground and/or frame 22) may be adjusted by a reel actuator 41 coupled between the reel frame 94 and the feeder 40. For instance, the reel actuator 41 may be a cylinder which is extendable and retractable to adjust a vertical position of the reel 92.

As the harvester 10 is propelled forwardly over a field with standing crop, the crop material is directed towards the cutter bar 96 by the reel 92. The crop material is severed from the stubble by the cutter bar 96 at the front of the header 34 and delivered by a header auger 54 to the front end 42 of the feeder 40, which supplies the cut crop to the threshing and separating assembly 46. As is generally understood, the threshing and separating assembly 46 may include a cylindrical chamber 56 in which the rotor 20 is rotated to thresh and separate the crop received therein. That is, the crop is rubbed and beaten between the rotor 20 and the inner surfaces of the chamber 56, whereby the grain, seed, or the like, is loosened and separated from the straw.

The harvested crop that has been separated by the threshing and separating assembly 46 may fall onto a crop cleaning assembly 58 of the crop processing system 32. In general, the crop cleaning assembly 58 may include a series of pans 60 and associated sieves 62, with the separated crop material being spread out via oscillation of the pans 60 and/or sieves 62 and eventually falling through apertures defined in the sieves 62. Additionally, a cleaning fan 64 may be positioned adjacent to one or more of the sieves 62 to provide an air flow through the sieves 62 that removes chaff and other impurities from the crop material. For instance, the fan 64 may blow the impurities off of the crop material for discharge from the harvester 10 through the outlet of a straw hood 66 positioned at the back end of the harvester 10. The cleaned crop material passing through the sieves 50 may then fall into a trough of an auger 68, which may be configured to transfer the crop material to an elevator 70 for delivery to the crop tank 16.

The configuration of the harvester 10 described above and shown in FIG. 1 is provided only to place the present subject matter in an exemplary field of use. Thus, the present subject matter may be readily adaptable to any manner of harvester configuration.

Furthermore, the harvester 10 may include one or more field condition sensors 72 coupled thereto and/or supported thereon. The field condition sensor(s) 72 is configured to generate data indicative of one or more conditions of the field across which the harvester 10 is traversing, such as data indicative of the compaction level of soil of the field and/or data indicative of the roughness of the surface of the field.

Figure 2:
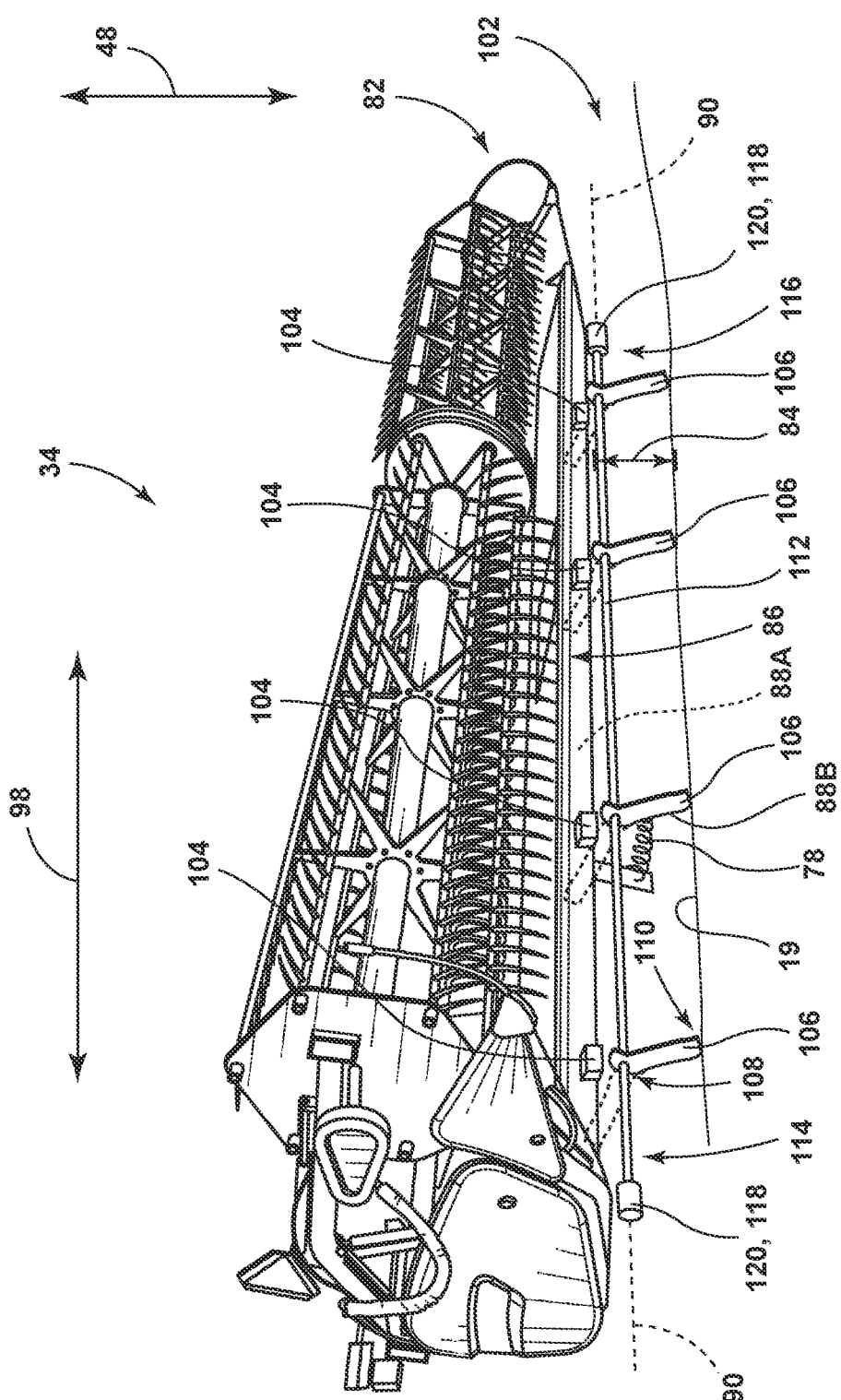
FIG. 2 illustrates a perspective view of one embodiment of a harvesting implement of an agricultural harvester in accordance with aspects of the present subject matter.

As will be described below, such data may subsequently be used to control the operation of an electrically activatable actuator 120 to rotate one or more sensor arms 106 (FIG. 2) of one or more implement height sensor assemblies 102 (FIG. 2).

In general, the field condition sensor(s) 72 may correspond to any suitable sensor(s) configured to generate data indicative of the compaction level of the soil of the field and/or data indicative of the roughness of the surface of the field. In several embodiments, the field condition sensor(s) 72 may be configured as an imaging device(s), such as a light detection and ranging (LiDAR), camera(s), and/or the like configured to depict a portion of the field within a field(s) of view 76 of the field condition sensor(s) 72. Furthermore, in alternative embodiments, the field condition sensor(s) 72 may be configured as any other suitable sensor(s) for generating data indicative of the compaction level of the soil of the field and/or the roughness of the surface of the field.

Furthermore, the harvester 10 may include any number of field condition sensors 72 provided at any suitable location that allows data indicative of the compaction level of the soil of the field and/or the roughness of the surface of the field to be generated. In this respect, FIG. 1 illustrates an example location for mounting the field condition sensor(s) 72 for generating data indicative of the compaction level of the soil of the field and/or the roughness of the surface of the field. For example, in embodiments in which the field condition sensor(s) 72 is configured as an imaging device(s), the field condition sensor(s) 72 may be mounted on the operator's cab 30 of the harvester 10 such that the field condition sensor(s) 72 has the field(s) of view 76 directed forward of the of the harvester 10. However, in alternative embodiments, the field condition sensor(s) 72 may be installed at any other suitable location(s) that allows the device(s) to generate data indicative of the compaction level of the soil of the field and/or the roughness of the surface of the field.

Additionally, the harvester 10 may include one or more vehicle speed sensors 74 coupled thereto and/or supported thereon. The vehicle speed sensor(s) 74 is configured to generate data indicative of the ground speed of the harvester base vehicle 52 as the harvester 10 traverses the field. As will be described below, such data may subsequently be used to control the operation of the electrically activatable actuator 120 to rotate the sensor arm(s) 106 of the implement height sensor assembly(ies) 102.

In general, the vehicle speed sensor(s) 74 may correspond to any suitable sensor(s) configured to generate data indicative of the ground speed of the harvester base vehicle 52. In several embodiments, the vehicle speed sensor(s) 74 may be configured as an accelerometer and/or the like. Furthermore, in alternative embodiments, the vehicle speed sensor(s) 74 may be configured as any other suitable sensor(s) for generating data indicative of the ground speed of the harvester base vehicle 52.

Furthermore, the harvester 10 may include any number of vehicle speed sensors 74 provided at any suitable location that allows data indicative of the ground speed of the harvester base vehicle 52 to be generated.

Referring now to FIG. 2, a perspective view of one embodiment of the header 34 is illustrated in accordance with aspects of the present subject matter. As shown in FIG. 2, one or more height sensor assemblies 102 may be provided in operative association with the header 34. As indicated above, the header 34 may be moved upward and downward along the vertical direction 48 relative to the field surface 19 to set the desired harvesting or cutting height. In several embodiments, the height sensor assembly(ies) 102 may be configured to detect a parameter indicative of the height or distance (e.g., as indicated by arrow 84 in FIG. 2) between the header 34 (e.g., a bottom 86 of the header 34) and the field surface 19.

In several embodiments, the height sensor assembly(ies) 102 may be configured as a contact-based sensor assembly(ies). For example, the height sensor assembly(ies) 102 may include a rotary sensor 104 (e.g., a rotary potentiometer or a magnetic rotary sensor) coupled to the frame 82 of the header 34 and a feeler or sensor arm 106 having a first end 108 pivotally associated with the rotary sensor 104 and an opposed second end 110 configured to engage the field surface 19. As such, when the height 84 of the header 34 is adjusted, the sensor arm 106 may pivot or rotate relative to the rotary sensor 104 and the frame 82 of the header 34 between a stored position 88A, in which the sensor arm 106 is fully retracted, and an open position 88B, in which the second end 110 of the sensor arm 106 is configured to engage the field surface 19. Additionally, the height sensor assembly(ies) 102 may include a biasing element 78, such as a spring, configured to bias the sensor arm 106 toward the field surface 19 when the sensor arm 106 is in the open position 88B. The rotary sensor 104 may, in turn, detect the pivotal or rotational motion of the sensor arm 106, with such pivotal movement being indicative of the height 84 of the header 34. Furthermore, the rotary sensor 104 may be configured to generate data indicative of the position of the sensor arm 106 relative to the frame 82 of the header 34. As will be described below, such data may be used by one or more computing systems to control the operation of the electrically activatable actuator 120 to rotate the sensor arm(s) 106.

For example, in one embodiment, the height sensor assembly(ies) 102 may include a sensor arm shaft 112 that extends between a first end 114 and a second end 116 in a lateral direction (as indicated by arrow 98) perpendicular to the vertical direction 48. The sensor arm shaft 112 may be coupled to the frame 82 of the header 34 at its first and second ends 114, 116 and may be configured to rotate about an axis of rotation 90 defined between the first and second ends 114, 116 parallel to the lateral direction 98. The sensor arm(s) 106 of the height sensor assembly(ies) 102 may be fixed to the sensor arm shaft 112. In this respect, as the sensor arm shaft 112 rotates about the axis of rotation 90, the sensor arm(s) 106 rotates with the sensor arm shaft 112 between the stored position 88A and the open position 88B.

In general, the sensor arm(s) 106 of the height sensor assembly(ies) 102 is easily pivoted or rotated when the sensor arm(s) 106 engages the field surface 19 and, thus, a pressure or load must be applied to the sensor arm(s) 106, which is typically accomplished with the biasing element 78, such as a spring or heavy materials for the sensor arm(s) 106. However, these practices of applying loads to the sensor arm(s) 106 do not allow for dynamic adjustment of the amount of the load that is being applied to the sensor arm(s) 106 to ensure that the sensor arm(s) 106 maintains contact with the field surface 19. Dynamic adjustment of the amount of load being applied to the sensor arm(s) 106 is useful when conditions of the field vary, such as soil compaction levels and/or the roughness of the field surface 19, and/or the ground speed of the harvester base vehicle 52, since such conditions of the field may affect the rotation of the sensor arm(s) 106 when the sensor arm(s) 106 engages the field surface 19. For example, increased roughness of the field surface 19, increased density of soil compaction, and/or increased speed of the harvester base vehicle 52 is directly proportional to increased pivoting of the sensor arm(s) 106 when the same pressure or load is applied to the sensor arm(s) 106.

As such, the header 34 may include one or more electrically activatable actuators 120. The electrically activatable actuator(s) 120 may be coupled to the sensor arm(s) 106 of the height sensor assembly(ies) 102 and configured to pivot or rotate the sensor arm(s) 106 between the stored position 88A and the open position 88B. Additionally, the electrically activatable actuator(s) 120 may be configured to apply a pressure or load to the sensor arm(s) 106 to limit or prevent the sensor arm(s) 106 from rotating from the stored position 88A or the open position 88B.

In some embodiments, the electrically activatable actuator(s) 120 may be configured as an electromagnetic actuator(s) 118, such as an electric motor(s). The electromagnetic actuator(s) 118 are configured to apply an electromagnetic load to rotate the sensor arm(s) 106 between the stored position 88A and the open position 88B. For example, as shown in FIG. 2, the electromagnetic actuator(s) 118 may be coupled to the sensor arm shaft 112 of the header 34 and configured to apply an electromagnetic load such that the sensor arm shaft 112 and, thus, the sensor arm(s) 106, is rotated about the axis of rotation 90. Additionally, when the sensor arm(s) 106 is in the open position 88B, the electromagnetic load applied by the electromagnetic actuator(s) 118 counteracts a pressure or load applied to the sensor arm(s) 106 by the field surface 19 to limit or prevent the sensor arm(s) 106 from rotating. As will be described below, one or more computing systems may adjust a magnitude of the electromagnet load applied by the electromagnetic actuator(s) 118.

Figure 3:
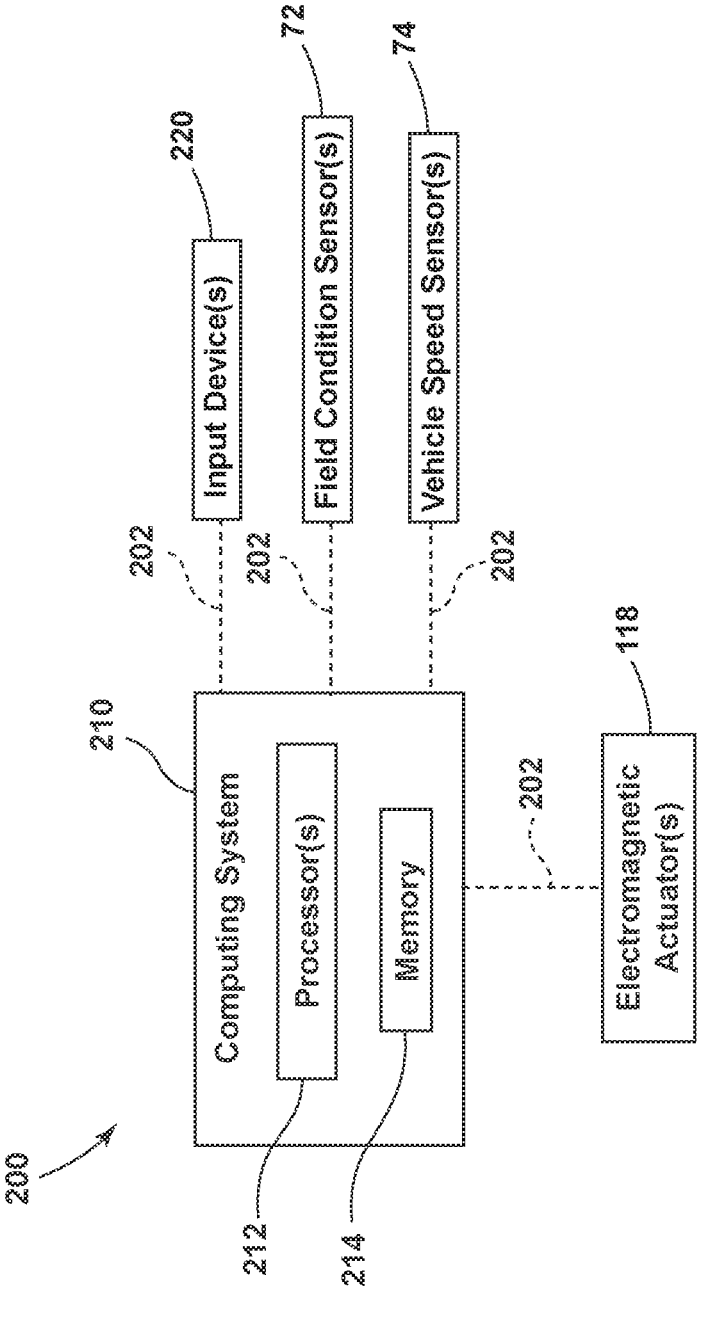
FIG. 3 illustrates a schematic view of one embodiment of a system for controlling the operation of an agricultural harvester in accordance with aspects of the present subject matter.

Referring now to FIG. 3, a schematic view of one embodiment of a system 200 for controlling the operation of an agricultural harvester is illustrated in accordance with aspects of the present subject matter. In general, the system 200 will be described herein with reference to the agricultural harvester 10 described above with reference to FIGS. 1 and 2. However, the disclosed system 200 may generally be utilized with agricultural harvester having any other suitable harvester configuration.

As shown in FIG. 3, the system 200 generally includes one or more components of the harvester 10. For example, in the illustrated embodiment, the system 200 includes the field condition sensor(s) 72, the vehicle speed sensor(s) 74, the rotary sensor(s) 104, and the electromagnetic actuator(s) 118 of the header 34.

Moreover, the system 200 includes a computing system 210 communicatively coupled to one or more components of the harvester 10 and/or the system 200 to allow the operation of such components to be electronically or automatically controlled by the computing system 210. For instance, the computing system 210 may be communicatively coupled to the field condition sensor(s) 72 via a communicative link 202. As such, the computing system 210 may be configured to receive data from the field condition sensor(s) 72, such as data indicative of the compaction level of the soil of the field and/or data indicative of the roughness of the surface of the field. Furthermore, the computing system 210 may be communicatively coupled to the vehicle speed sensor(s) 74 via the communicative link 202. In this respect, the computing system 210 may be configured to receive data from the vehicle speed sensor(s) 74, such as data indicative of the ground speed of the harvester base vehicle 52. Additionally, the computing system 210 may be communicatively coupled to the rotary sensor(s) 104 via the communicative link 202. In this respect, the computing system 210 may be configured to receive data from the rotary sensor(s) 104, such as data indicative of the position(s) of the sensor arm(s) 106 of the height sensor assembly(ies) 102 relative to the frame 82 of the header 34. Moreover, the computing system 210 may be communicatively coupled to the electromagnetic actuator(s) 118 via the communicative link 202. In this respect, the computing system 210 may be configured to control the operation of the electromagnetic actuator(s) 118, such as by adjusting magnitude of electromagnetic load applied by the electromagnetic actuator(s) 118. In addition, the computing system 210 may be communicatively coupled to any other suitable components of the harvester 10 and/or the system 200.

In general, the computing system 210 may comprise any suitable processor-based device known in the art, such as a given controller or computing device or any suitable combination of controllers or computing devices. Thus, in several embodiments, the computing system 210 may include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the computing system 210 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 214 may generally be configured to store suitable computer-readable instructions that, when implemented by the processor(s) 212, configure the computing system 210 to perform various computer-implemented functions, such as one or more aspects of the methods and algorithms that will be described herein. In addition, the computing system 210 may also include various other suitable components, such as a communications circuit or module, one or more input/output channels, a data/control bus and/or the like.

It should be appreciated that the computing system 210 may correspond to an existing computing system(s) of the harvester 10, itself, or the computing system 210 may correspond to a separate processing device. For instance, in one embodiment, the computing system 210 may form all or part of a separate plug-in module that may be installed in association with the harvester 10 to allow for the disclosed systems to be implemented without requiring additional software to be uploaded onto existing control devices of the harvester 10.

Furthermore, it should also be appreciated that the functions of the computing system 210 may be performed by a single processor-based device or may be distributed across any number of processor-based devices, in which instance such devices may be considered to form part of the computing system 210. For instance, the functions of the computing system 210 may be distributed across multiple application-specific controllers or computing devices, such as a navigation controller, an engine computing controller, a transmission controller, an implement controller and/or the like.

In addition, the system 200 may also include one or more input devices 220. More specifically, the input device(s) 220 may be configured to receive inputs (e.g., inputs to rotate the sensor arm(s) 106) from the operator. For example, in several embodiments, the input device(s) 220 may be configured as a user interface(s). The user interface(s) may include a touchscreen(s), keypad(s), touchpad(s), knob(s), button(s), slider(s), switch(s), mice, microphone(s), and/or the like, which are configured to receive inputs from the operator. Such inputs may be used by the computing system 210 for use in controlling the operation of the electromagnetic actuator(s) 118. Moreover, the user interface(s) may include one or more feedback devices (not shown), such as display screens, speakers, warning lights, and/or the like, which are configured to provide feedback from the computing system 210 to the operator. As such, the input device(s) 220 may, in turn, be communicatively coupled to the computing system 210 via the communicative link 202 to permit the feedback to be transmitted from the computing system 210 to the input device(s) 220.

Additionally, the input device(s) 220 may be mounted or otherwise positioned within the operator's cab 30. However, in alternative embodiments, the input device(s) 220 may mounted at any other suitable location.

Referring now to FIG. 4, a flow diagram of one embodiment of control logic 300 that may be executed by the computing system 210 (or any other suitable computing system) for controlling the operation of an agricultural harvester is illustrated in accordance with aspects of the present subject matter. Specifically, the control logic 300 shown in FIG. 4 is representative of steps of one embodiment of an algorithm that can be executed to electronically control the position of the arms of an implement height sensor assembly of a harvesting implement of an agricultural harvester 10. Thus, in several embodiments, the control logic 300 may be advantageously utilized in association with a system installed on or forming part of an agricultural harvester to allow for real-time control of the harvester without requiring substantial computing resources and/or processing time. However, in other embodiments, the control logic 300 may be used in association with any other suitable system, application, and/or the like for controlling the operation of an agricultural harvester.

As shown in FIG. 4, at (302), the control logic 300 includes receiving an input to rotate an arm of an implement height sensor assembly to an open position. Specifically, as mentioned above, in several embodiments, the computing system 210 is communicatively coupled to the input device 220 via the communicative link 202. In this respect, prior to the harvester 10 traveling across the field to perform a harvesting operation thereon, the computing system 210 may receive an operator input from the input device 220 to rotate the sensor arm(s) 106 of the implement height sensor assembly 108 to the open position 88B relative to the frame 82 of the header 34.

Furthermore, at (304), the control logic 300 includes controlling an operation of an electromagnetic actuator to rotate the arm to the open position and based on the received input. Specifically, as mentioned above, in several embodiments, the computing system 210 is communicatively coupled to the electromagnetic actuator(s) 118 via the communicative link 202. In this respect, the computing system 210 is configured to control the operation of the electromagnetic actuator(s) 118, such as by increasing a magnitude of electromagnetic load applied by the electromagnetic actuator(s) 118, to rotate the sensor arm(s) 106 to the open position 88B based on the input received at (302).

Moreover, at (306), the control logic 300 includes receiving field condition sensor data indicative of a compaction level of the soil of the field. Specifically, in several embodiments, the computing system 210 is communicatively coupled to the field condition sensor(s) 72 via the communicative link 202. In this respect, the computing system 210 is configured to receive data from the field condition sensor(s) 72 indicative of the compaction level of the soil of the field.

Furthermore, at (308), the control logic 300 includes determining the compaction level of the soil of the field based on the received field condition sensor data. Specifically, in several embodiments, the computing system 210 is configured to determine the compaction level of the soil of the field based on the data received at (306). For example, in one embodiment, the computing system 210 may access a look-up table(s) stored within its memory device(s) 214 that correlates the field condition sensor data received at (306) to a value(s) of the compaction level of the soil of the field.

Additionally, at (310), the control logic 300 includes receiving field condition sensor data indicative of a roughness of the surface of the field. Specifically, in several embodiments, the computing system 210 is configured to receive data from the field condition sensor(s) 72 indicative of the roughness of the surface of the field.

Moreover, at (312), the control logic 300 includes determining the roughness of the surface of the field based on the received field condition sensor data. Specifically, in several embodiments, the computing system 210 is configured to determine the roughness of the surface of the field based on the field condition sensor data received at (310). For example, in one embodiment, the computing system 210 may access a look-up table(s) stored within its memory device(s) 214 that correlates the field condition sensor data received at (310) to a value(s) of the roughness of the surface of the field.

Furthermore, as shown in FIG. 4, at (314), the control logic 300 includes receiving vehicle speed sensor data indicative of the ground speed of the harvester base vehicle. Specifically, in several embodiments, the computing system 210 is communicatively coupled to the vehicle speed sensor(s) 74 via the communicative link 202. In this respect, the computing system 210 is configured to receive data from the vehicle speed sensor(s) 74 indicative of the ground speed of the harvester base vehicle 52.

Additionally, at (316), the control logic 300 includes determining the ground speed of the harvester base vehicle based on the received vehicle speed sensor data. Specifically, in several embodiments, the computing system is configured to determine the ground speed of the harvester base vehicle 52 based on the vehicle speed sensor data received at (314).

Moreover, at (318), the control logic 300 includes adjusting a magnitude of electromagnetic load applied by the electromagnetic actuator to prevent the arm from rotating relative to the frame based on at least one of the determined compaction level of the soil, the determined roughness of the surface of the field, and/or the determined ground speed of the harvester base vehicle. Specifically, in several embodiments, the computing system 210 may be configured to adjust the magnitude of the electromagnetic load applied by the electromagnetic actuator(s) 118 to prevent the sensor arm(s) 106 from rotating relative to the frame 82 of the header 34 based on the compaction level of the soil determined at (308), the roughness of the surface of the field determined at (312), and/or the ground speed of the harvester base vehicle 52 determined at (316).

Figure 5:
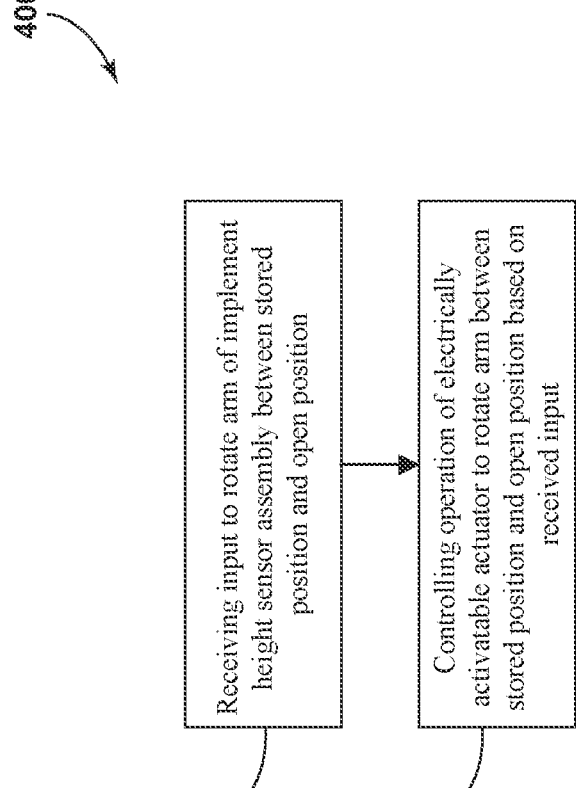
FIG. 5 illustrates a flow diagram of one embodiment of a method for controlling the operation of an agricultural harvester in accordance with aspects of the present subject matter.

Referring now to FIG. 5, a flow diagram of one embodiment of a method 400 for controlling the operation of an agricultural harvester is illustrated in accordance with aspects of the present subject matter. In general, the method 400 will be described herein with reference to the harvester 10 and the system 200 described above with reference to FIGS. 1-4. However, it should be appreciated by those of ordinary skill in the art that the disclosed method 400 may generally be implemented with any agricultural harvester having any suitable harvester configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (402), the method 400 includes receiving, with a computing system, an input to rotate an arm of an implement height sensor assembly relative to the harvesting implement between a stored position and an open position in which the arm is configured to contact a surface of the field as the harvesting implement is moved through the field. For instance, as described above, the computing system 210 may be configured to receive an input to rotate the sensor arm(s) 106 of the implement height sensor assembly 102 relative to the header 34 between the stored position 88A and the open position 88B.

Additionally, at (404), the method 400 includes controlling, with the computing system, an operation of an electrically activatable actuator coupled to the arm of the implement height sensor assembly to rotate the arm between the stored position and the open position based on the received input and, once in position, prevent the arm from rotating. For instance, as described above, the computing system 210 may be configured to control the operation of the electromagnetic actuator(s) 118 to rotate the sensor arm(s) 106 between the stored position 88A and the open position 88B based on the received input.

It is to be understood that the steps of the control logic 300 and the method 400 are performed by the computing system 210 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 210 described herein, such as the control logic 300 and the method 400, is implemented in software code or instructions which are tangibly stored on a tangible computer readable medium. The computing system 210 loads the software code or instructions via a direct interface with the computer readable medium or via a wired and/or wireless network. Upon loading and executing such software code or instructions by the computing system 210, the computing system 210 may perform any of the functionality of the computing system 210 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A harvesting implement, comprising:
a frame coupled to a harvester base vehicle;
a cutter bar that severs crop material from a field;
a reel rotatably coupled to the frame and directs the crop material toward the cutter bar;
an implement height sensor assembly including an arm coupled to the frame, the arm being rotatable relative to the frame between a stored position and an open position in which the arm contacts a surface of the field as the harvesting implement is moved through the field;
a biasing element that biases the arm of the implement height sensor toward the surface of the field when the arm is in the open position; and
an electrically activatable actuator coupled to the arm of the implement height sensor assembly, whereby the electrically activatable actuator rotates the arm relative to the frame between the stored position and the open position and applies a load to prevent the arm from rotating from the stored position or the open position.

2. The harvesting implement of claim 1, wherein the implement height sensor assembly generates data indicative of a position of the arm of the implement height sensor assembly relative to the frame.

3. The harvesting implement of claim 1, further comprising:
an input device that receives an operator input to rotate the arm between the stored position and the open position; and
a computing system communicatively coupled to the input device, the computing system controlling the operation of the electrically activatable actuator to rotate the arm based on the received operator input and, once the arm is in position, prevent the arm from rotating relative to the frame.

4. The harvesting implement of claim 1, wherein:
the electrically activatable actuator acts as an electromagnetic actuator in applying an electromagnetic load to rotate the arm between the stored position and the open position; and
when the arm is in the open position, the electromagnetic load applied by the electromagnetic actuator counteracts a load applied to the arm by the surface of the field to prevent the arm from rotating relative to the frame.

5. The harvesting implement of claim 4, wherein:
when the arm is in the stored position, the electromagnetic load applied by the electromagnetic actuator holds the arm in the stored position.

6. The harvesting implement of claim 4, further comprising:
a field condition sensor that generates data indicative of a compaction level of soil of the field; and
a computing system communicatively coupled to the field condition sensor, the computing system configured to:
determine the compaction level of the soil of the field based on the data generated by the field condition sensor; and
adjust a magnitude of the electromagnetic load applied by the electromagnetic actuator to prevent the arm from rotating relative to the frame based on the determined compaction level of the soil of the field.

7. The harvesting implement of claim 4, further comprising:
a field condition sensor that generates data indicative of a roughness of the surface of the field; and
a computing system communicatively coupled to the field condition sensor, the computing system configured to:
determine the roughness of the surface of the field based on the data generated by the field condition sensor; and
adjust a magnitude of the electromagnetic load applied by the electromagnetic actuator to prevent the arm from rotating relative to the frame based on the determined roughness of the surface of the field.

8. The harvesting implement of claim 4, further comprising:
a vehicle speed sensor that generates data indicative of a ground speed of the harvester base vehicle; and
a computing system communicatively coupled to the vehicle speed sensor, the computing system configured to:
determine the ground speed of the harvester base vehicle based on the data generated by the field condition sensor; and
adjust a magnitude of the electromagnetic load applied by the electromagnetic actuator to prevent the arm from rotating relative to the frame based on the determined ground speed of the harvester base vehicle.

9. The harvesting implement of claim 1, the implement height sensor assembly further comprising:
a shaft extending between a first end and a second end, each end coupled to the frame of the harvesting implement, the shaft rotatable about an axis defined between the first end and the second end, and
wherein:
the arm is fixed to the shaft such that rotation of the shaft results in rotation of the arm between the stored position and the open position, and
the electrically activatable actuator is coupled to the shaft and rotates the shaft.

10. A system for controlling the operation of an agricultural harvester, the system comprising:
a harvesting implement pivotably coupled to a harvester base vehicle, the harvesting implement being pivoted such that a height of the harvesting implement above a surface of a field is adjusted;
an implement height sensor assembly including an arm coupled to the harvesting implement, the arm being rotatable relative to the harvesting implement between a stored position and an open position in which the arm contacts a surface of the field as the harvesting implement is moved through the field; and
an electrically activatable actuator coupled to the arm of the implement height sensor assembly and rotates the arm relative to the harvesting implement between the stored position and the open position and apply a load to prevent the arm from rotating from the stored position or the open position;

a computing system configured to:

receive an input to rotate the arm between the stored position and the open position; and operate the electrically activatable actuator, whereby the arm is rotated relative to the harvesting implement between the stored position and the open position based on the received input and, once the arm is in position, prevented from rotating.

11. The system of claim 10, wherein the implement height sensor assembly generates data indicative of a position of the arm of the implement height sensor assembly relative to the frame.

12. The system of claim 10, wherein:

the electrically activatable actuator acting as an electromagnetic actuator applying an electromagnetic load to rotate the arm between the stored position and the open position; and when the arm is in the open position, the electromagnetic load applied by the electromagnetic actuator counteracts a load applied to the arm by the surface of the field to prevent the arm from rotating relative to the harvesting implement.

13. The system of claim 12, wherein:

when the arm is in the stored position, the electromagnetic load applied by the electromagnetic actuator holds the arm in the stored position.

14. The system of claim 12, further comprising:

a field condition sensor that generates data indicative of a compaction level of soil of the field, wherein:

the computing system is communicatively coupled to the field condition sensor, the computing system further configured to:

determine the compaction level of the soil of the field based on the data generated by the field condition sensor; and adjust a magnitude of the electromagnetic load applied by the electromagnetic actuator to prevent the arm from rotating relative to the harvesting implement based on the determined compaction level of the soil of the field.

15. The system of claim 12, further comprising:

a field condition sensor that generates data indicative of a roughness of the surface of the field, wherein:

the computing system is communicatively coupled to the field condition sensor, the computing system further configured to:

determine the roughness of the surface of the field based on the data generated by the field condition sensor; and adjust a magnitude of the electromagnetic load applied by the electromagnetic actuator to prevent the arm from rotating relative to the harvesting implement based on the determined roughness of the surface of the field.

16. The system of claim 12, further comprising:

a vehicle speed sensor that generates data indicative of a ground speed of the harvester base vehicle, wherein:

the computing system is communicatively coupled to the vehicle speed sensor, the computing system further configured to:

determine the ground speed of the harvester base vehicle based on the data generated by the field condition sensor; and adjust a magnitude of the electromagnetic load applied by the electromagnetic actuator to prevent the arm from rotating relative to the harvesting implement based on the determined ground speed of the harvester base vehicle.

17. The system of claim 10, the implement height sensor assembly further comprising:

a shaft extending between a first end and a second end, each end coupled to the frame of the harvesting implement, the shaft rotatable about an axis defined between the first end and the second end, and wherein:

the arm is fixed to the shaft such that rotation of the shaft results in rotation of the arm between the stored position and the open position, and the electrically activatable actuator is coupled to the shaft and rotates the shaft.

18. A method for controlling the operation of an agricultural harvester, the agricultural harvester including a harvesting implement coupled to a harvester base vehicle, the method comprising:

receiving, with a computing system, an input to rotate an arm of an implement height sensor assembly relative to the harvesting implement between a stored position and an open position in which the arm is configured to contact a surface of the field as the harvesting implement is moved through the field; and operating, with the computing system, an electrically activatable actuator coupled to the arm of the implement height sensor assembly, whereby the arm is rotated relative to the harvesting implement between the stored position and the open position based on the received input and, once the arm is in position, prevented from rotating.

\* \* \* \* \*